Dec. 24, 1929.  J. C. PELTON  1,740,711
AUTOMATIC BRICK MAKING MACHINE AND APPARATUS
Filed Feb. 24, 1927   3 Sheets-Sheet 1

INVENTOR.
BY
ATTORNEYS.

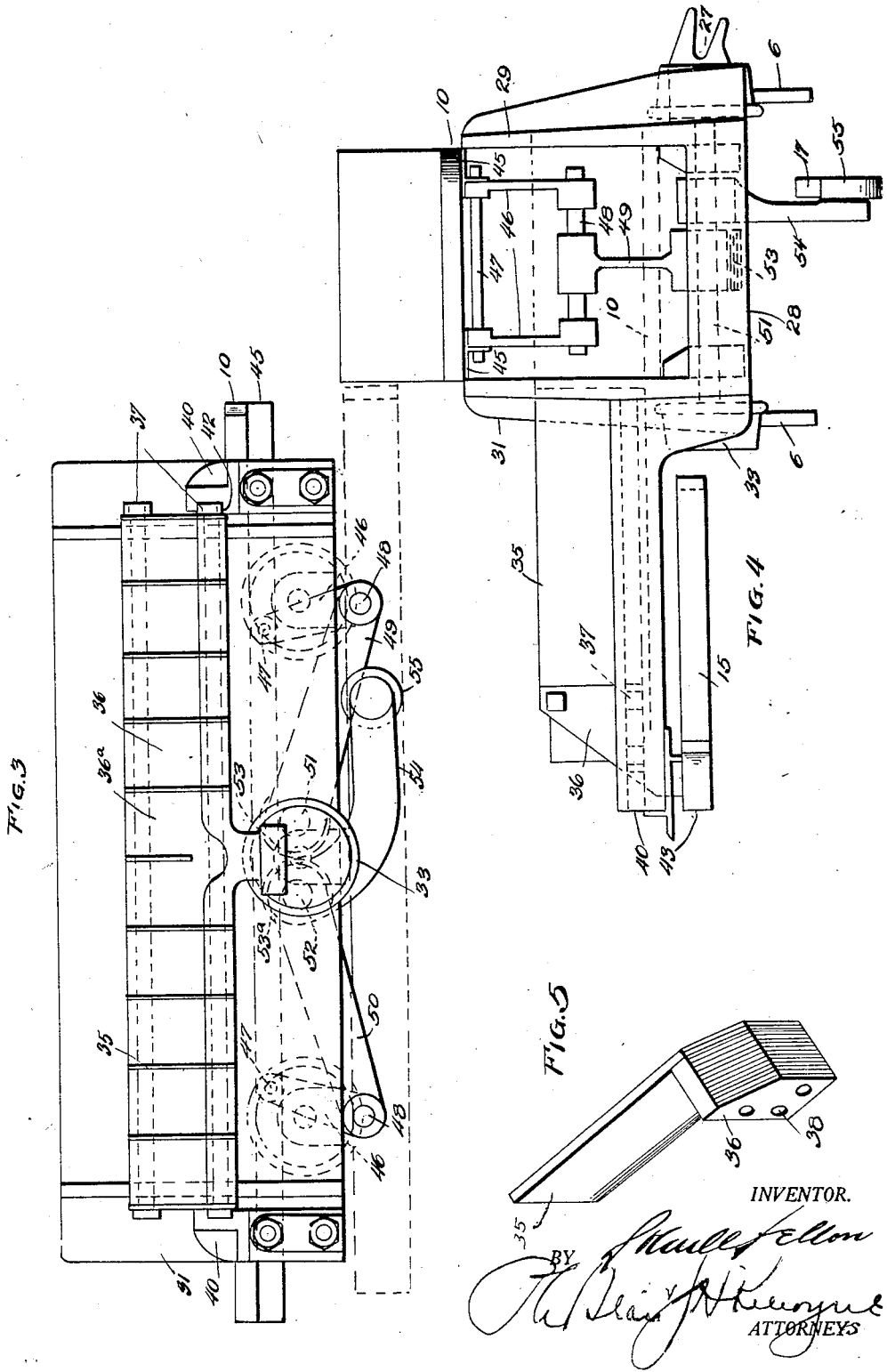

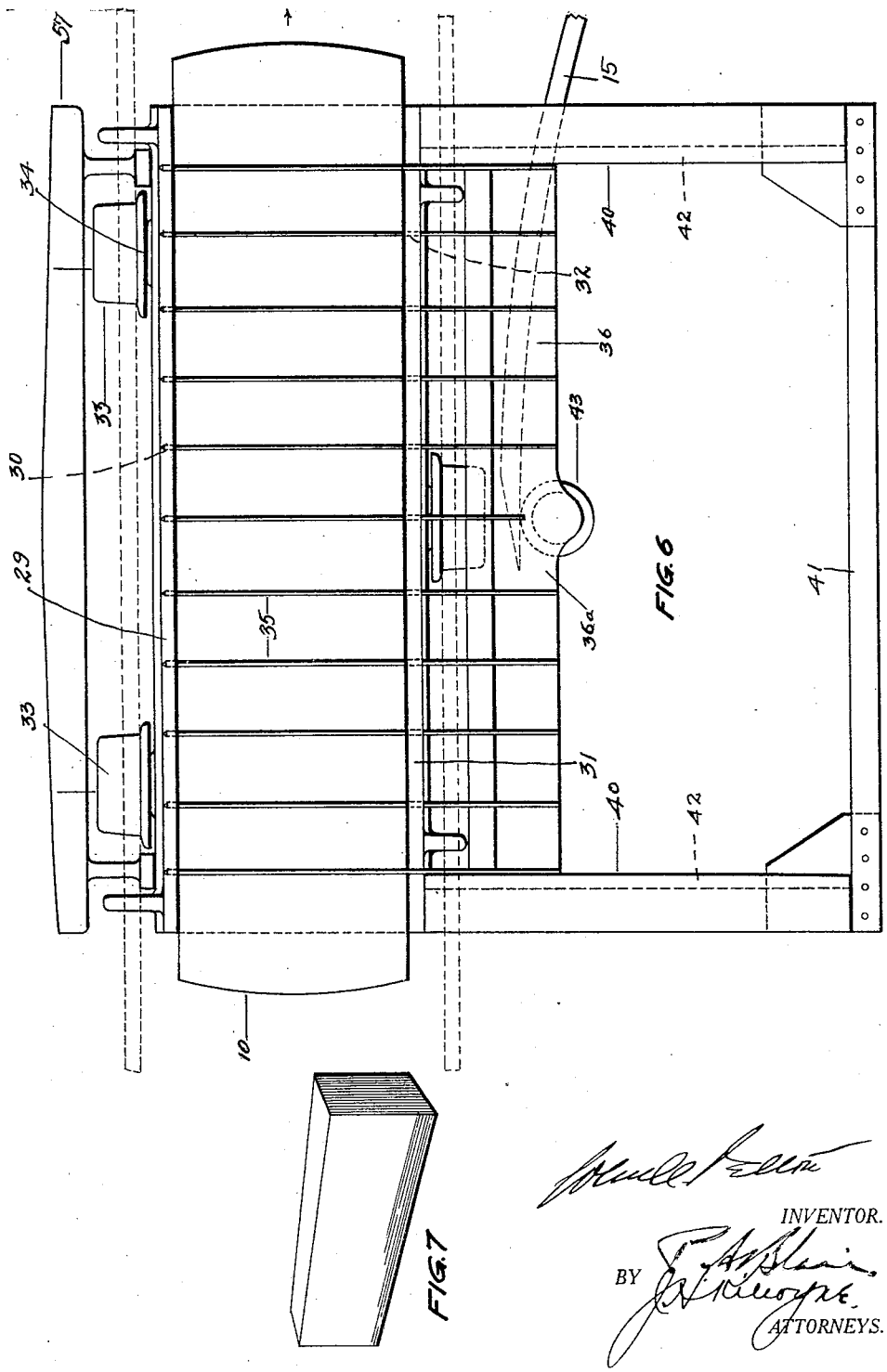

Patented Dec. 24, 1929

1,740,711

UNITED STATES PATENT OFFICE

JOHN C. PELTON, OF SANTA BARBARA, CALIFORNIA, ASSIGNOR TO IMPROVED BRICK CORPORATION OF DELAWARE, A CORPORATION OF DELAWARE

AUTOMATIC BRICK-MAKING MACHINE AND APPARATUS

Application filed February 24, 1927. Serial No. 170,676.

My invention relates to automatic apparatus for forming concrete and plastic products, and more particularly to apparatus for automatically and continuously forming concrete brick, tile, pipe, artificial stone and other concrete or plastic products for use in building construction and other purposes, and to the method of continuously producing concrete and plastic products generally.

Among the objects of my invention may be noted the provision of apparatus for automatically and continuously forming concrete and plastic products in a continued sequence of operation; the provision of improved forming apparatus, such as a mould, for forming concrete and plastic products of the above noted character; the provision of means to move the forming mechanism continuously along a course of travel; the provision of improved apparatus delivering the ingredients of wet materials to the forming mechanism; the provision of means to settle the said ingredients or materials in the forming mechanism; the provision of mechanism to eject the formed product from the forming apparatus and upon suitable carriers upon completion of the forming operation; the provision of mechanism to return the moulds to material receiving position; and the provision of a method for forming concrete and plastic products in a continuous and automatic sequence of operation.

Other objects will be in part obvious and in part pointed out in connection with the annexed drawings and the following analysis of my invention.

In accordance with my invention, I provide a track, preferably endless, upon which a mould is adapted to travel. During the course of travel of the mould, the wet material from which the concrete or plastic products are to be formed is delivered to the mould, which is subsequently vibrated to compact and settle the material upon a pallet mounted therein. Further travel of the mould causes the pallet to be automatically lifted from the mould and ejected therefrom. Thereafter a clean pallet is delivered to the mould which is then washed and returned to operative position for a subsequent forming operation.

In the drawings annexed to the present specification, I have illustrated my invention in conjunction with apparatus for manufacturing concrete brick. It will be understood that the invention is not to be limited to apparatus for forming the specific product named or to the specific plastic material making up the same and is applicable to other concrete products and/or plastic materials.

In these drawings, wherein similar parts are denoted by corresponding reference characters—

Fig. 3 is a side elevation of a mould in accordance with my invention.

Fig. 4 is an end elevation of the mould illustrated in Fig. 3 in substantially product ejecting relation.

Fig. 5 is a detail in perspective of certain parts of the mould.

Fig. 6 is a top plan view of the mould illustrated in Fig. 3.

Fig. 7 is a perspective view of a brick formed by the above referred to apparatus.

Figure 1:
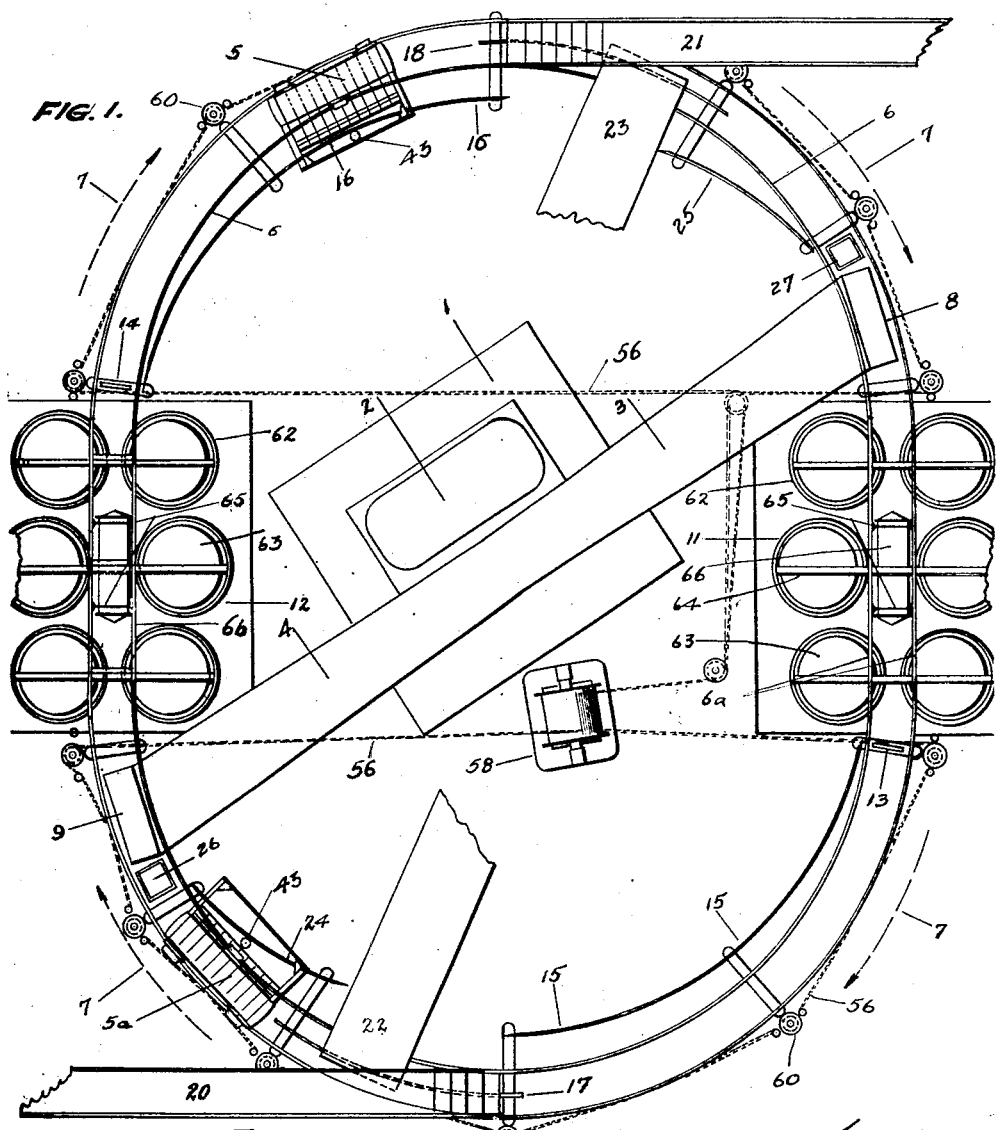
Fig. 1 is a plan view of the complete apparatus as exemplified in a plant making concrete brick in accordance with my invention.
Figure 2:
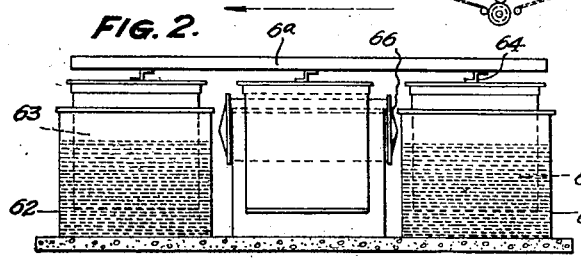
Fig. 2 is an elevation, partly in section, of my vibrating or compacting mechanism.

Referring now to the drawings and particularly Fig. 1, I have illustrated my invention in connection with apparatus including an endless surface track of ovate contour forming a substantially horizontal path of travel for two traveling moulds. The brick making plant illustrated may be termed a two cycle plant in that each mould travels thru two forming paths and each produces two batches of concrete brick during a complete circuit of the track. The lay-out shown illustrates but one application of my invention, which may be similarly applied to circular paths of travel or parallel paths connected by switchovers, or to an apron conveyor or other continuous system for rapid and economical production. Similarly, instead of the two moulds indicated, only one mould may form but one lot of bricks for each complete circuit of the track, or any greater approved number of moulds may follow each other in operation, or any approved number of forming operations may be carried out during the travel of a mould or moulds thru a complete circuit of the track.

In the drawings, reference character 1 designates a material supply platform upon which is positioned a mixer 2 of any conventional type. Suitable materials automatically or manually fed to the mixer are therein incorporated and delivered to hopper chutes 3, 4. Moulds 5 and 5ª travel in an endless path, such as a suitable cross-trussed track 6, in the direction of arrows 7, the said track being arranged about the supply platform 1. As the moulds pass under hoppers 8 and 9, which receive the material from the chutes 3 and 4, the wet material is discharged into the moulds and upon pallets 10 supported therein to the filling level of each mould. The moulds then pass to vibrating or compacting apparatus 11, 12, where the wet mass of concrete in the moulds is compacted to a standard sized product. The compacting apparatus to be hereinafter described in a commercial form of the vibrator or compacting apparatus for plastic materials shown in my Patent, No. 1,306,620, dated June 10, 1919.

If it is desired to strike off the top surface of the bricks or other products in the mould to obtain a finish of the product, wipers or scrapers 13, 14 straddling the track 6 are provided in the path of travel of the moulds as they leave the compacting apparatus 11 and 12. Cam rails 15, 16 are positioned adjacent to and eccentrically with respect to the track 6 and engage the traveling moulds to automatically actuate said moulds into open position to permit removal of the set products therefrom. Arranged intermediate the rails of the track 6 and on a lower plane with respect thereto are cam rails 17, 18 which are engaged by the traveling moulds in such manner that the pallets 10 carried by the moulds and upon which the moulded product is set, are automatically raised from the moulds and ejected or discharged therefrom and transferred on to belt or roller conveyors 20 and 21. The pallets with the moulded product thereon travel on said conveyors to suitable curing or storing spaces (not shown).

The moulds then pass under pallet hoppers 22, 23 from which a clean pallet is separately tripped into each car and subsequently lowered into material receiving position. Cam rails 24, 25 are provided, which subsequently engage the moulds and actuate them into closed position. The moulds advance under suitable washing racks forming a unit of the track equipment and diagrammatically illustrated at 26, 27, the said racks preferably comprising a system of water sprays delivering water to the moulds to thoroughly wash the same. The moulds are then returned to the hoppers 3 and 4 to receive a new charge for the next forming operation.

Referring to Figs. 3 to 6, inclusive, each of the traveling moulds 5 and 5ª comprises a frame 28, formed of a one piece metal casting having its ends open and one side member 29 provided with spaced grooves 30 and its other side member 31 having formed therein spaced slots 32. The frame is supported on the track 6 by the three wheels 33 arranged in ball bearings 34 on the under portion of said frame member. A plurality of partition members, such as blades 35, each secured to a spacing block 36 in any approved manner, are bolted together to move in unison as by through bolts 37 extending in bored holes 38 thru the blades and spacing blocks. The blades normally extend thru slots 32 in the side member 31 and are socketed in grooves 30 in side member 29 to form with the said side members a multiple compartment mould.

The side 31 of frame 28 is provided with laterally extending guide brackets 40 connected by a joining member 41, the brackets having machined slots 42 formed therein. Journaled in the central spacing block, designated as 36ª, is a cam roller 43 which, when engaged by either cam rail 15, 16, causes the blades 35 to be laterally retracted from the frame 28 and the mould to be opened to permit withdrawal of the pallet board. During this actuation, the blades and spacing blocks are extended to the position shown in Fig. 4, the heads of through bolts 37 traveling in machined slots 42 of brackets 40. Reversely, when the cam roller 43 engages either cam rail 24, 25, the blades 35 are projected relatively inwardly to form the mould compartments as indicated in Fig. 6, and the moulds are in closed position.

The pallet 10, which may be constructed of wood or metal, is mounted in the frame 28 between the sides thereof and is normally supported in lowered position upon an angle iron platform or frame 45. The pallet lifting and lowering mechanism comprises the four link arms 46 depending from rods 47 mounted across the frame 45. At the lower ends of each pair of the said links, I mount shafts 48 from which are supported lever arms 49, 50. The adjacent ends of said lever arms 49, 50 are mounted from shafts 51 and 52 for rotation therewith and have intermeshing engagement by reason of segmental gear teeth 53 and 53ª provided therein. Fixed on shaft 52 is a depending arm 54 having journaled at its free end a cam roller 55. The arm 54 and roller 55 are so positioned with relation to either cam rail 17, 18 that engagement therebetween during the travel of the mould causes the cam roller to be lowered. Rotation of shaft 52 results and the geared lever arms 49, 50 are actuated upwardly from shafts 51, 52 to raise the frame member 45 thru the toggle actuation of links 46. Disengagement of cam roller 55 from the rails 17, 18 causes the frame 45 and pallet positioned thereon to be lowered by gravity.

The moulds are driven throughout the track circuit by a cable 56 which engages sheave segment 57 on each car (Fig. 4), the cable being driven from a rotating cable drum 58 at an approved speed. At certain points about the track 6, I arrange thrust sheaves 60 around which the cable passes. The thrust sheaves serve to relieve excess side thrust on the moulds. This arrangement of drive for the moulds is intended to be typical of many which might be employed, and I do not wish to be restricted to the specified arrangement which I have shown.

Considering that the traveling mould 5 is about to start its product forming cycle, it will be understood that blades 35 are in closed position as indicated in Fig. 6 and provide with sides 29, 31 of the mould frame 28 and pallet 10 positioned thereon in its lower position, a multiple compartment mould to form an arbitrary number of forming compartments, such as the ten compartments shown. The wet concrete material is delivered from the mixer 2 thru chute 3 and delivered thru hopper 8 to the mould 5 and into the compartments thereof. Any suitable mechanism for cutting off the wet mass to the moulds when the compartments have been charged to their filling level may be provided. The drive cable 56 advances the mould on track 6 to the compacting apparatus 11 where the wet concrete is compacted into a homogeneous mass and is formed into blocks of the size and shape defined by the mould compartments.

The compacting apparatus illustrated embodies the principle of operation disclosed in my prior Patent, No. 1,306,620, in which a mass to be compacted is vibrated upon a fluid supported platform. This apparatus comprises a plurality of fluid containers 62 arranged in pairs across the track upon a suitable base and substantially filled with a fluid such as water. In each of the said containers is mounted a pontoon 63 of the open bottom and closed top type which contains air at atmospheric or greater pressure. The pontoons 63 thus float upon the liquid in containers 62, the space above the free liquid in the container being, of course, filled with air. Oppositely arranged pontoons are connected by angle irons 64 upon which is mounted a track section $6^a$, the angle irons and track section forming a frame for the floating pontoons. Suspended from this frame as from the track section $6^a$ by brackets 65 is a self-contained motor 66 which has its rotor eccentrically balanced as by attached weights (not shown) arranged off center at each end thereof. Rotation of said rotor causes the pontoon frame, including the track section and pontoons, to be constantly vibrated or jarred in a variety of agitating movements and combinations of the same according to the type of materials that are being compacted. Any approved mechanism for imparting vibration to the track section $6^a$ upon its fluid supported platform may be substituted for the unbalanced rotor and such is included within the scope of my invention.

The traveling mould 5 advances on to the track section $6^a$ supported from the pontoons and is subjected to the vibrating action above noted, whereby the wet mass in the mould compartments is thoroughly compacted and set into desired form. By reason of the mould wheels 33, on frame 28 being mounted in ball bearings 34, the vibration is uniformly transmitted to the plastic concrete in the mould.

The pontoons 63 are maintained air-tight, and I propose to control their elevation by the pressure of the air trapped therein. The control of the pontoon elevation is important as regards the track elevation in that materials in the moulds vary in weight; as example, heavy brick blocks as distinguished from tile or small bricks, are noted. With a light load in the mould, the pontoons have a tendency to elevate themselves, necessitating a reduction of the air pressure therein to lower the track section $6^a$ and to permit the mould to advance by the said track section. Reversely, heavy materials carried by the moulds cause the pontoons to be depressed, which necessitates the establishment of an increased air pressure by pumping air therein to elevate the track section. The impetus of the mould before it advances on to the track section $6^a$ is generally sufficiently great to carry it therethru and on to the main track 6. The track section $6^a$ may be slightly sloped, however, to advance the mould thereover, or a positive drive may be imparted to the mould across said section, if desired. The constant agitation of the mould aids in advancing the mould across said track section $6^a$ and on to the track proper.

By reference to Fig. 1, it will be noted that the track section $6^a$ comprises straight portions of track inserted into the otherwise ovate track proper. It has been found that if the pontoons and vibrator mechanism operate upon a curved portion of a track, the compacting results are not the equal to the results obtained when the track across the pontoons extends straight-way, as indicated. This application of a vibrated straight track section is likewise advisable with a track-way of circular or other contour. The compacting apparatus 12 indicated at the opposite portion of the track 6 in Fig. 1 is identical to the apparatus above described when used in a two cycle plant and acts to vibrate a track section $6^b$ for purposes of compaction.

The materials having now been set and formed in the mould 5, the said mould is advanced on the track 6 under the wiper or scraper 13 which serves to level off, smooth or roughen the top surface of the product in the mould. At substantially this point in the path of its travel, cam roller 43 mounted on the mould engages cam rail 15 and gradually withdraws or retracts blades 35 from the mould frame 28. At the most advanced portion of cam rail 15, the said blades have been completely retracted from between the formed products maintained upon the pallet 10 freely supported in the mould.

Cam roller 55 mounted from the arm 54 of the pallet lifting mechanism as hereinbefore described thereafter engages cam rail 17, causing platform 45 upon which pallet 10 is supported and which carries a plurality of formed products, to be raised as indicated in Fig. 4.

The endless belt or conveyor mechanisms 20 and 21 are preferably tangentially arranged with respect to the track 6 and are so related thereto that as the mould 5 passes the juncture of the track and belt 20 with the pallet maintained in raised position, the pallet and its load of brick is switched tangentially on to the belt and carried away, to suitable curing or drying spaces (not shown), and the mould advances on the track 6.

With the pallet lifting mechanism maintained in its raised position by reason of continued engagement of cam roller 54 with cam rail 17, the mould passes under the pallet conveyor 22 from which a clean pallet is automatically tripped on to frame platform 46 of the mould by any suitable escapement mechanism (not shown), the blades 35 remaining in their retracted or open position. The pallets 10 are preferably fed from the conveyor 22 between a wall structure directly above the track and under which the mould passes. A pallet or pallets are normally fed to said wall structure, and the lowermost pallet is tripped on to the frame platform 46 of the mould by the escapement mechanism engaging notches in the pallet which is rendered operative by engagement with the mould as said mould advances thereunder. Cam roller 55 thereafter rides off cam rail 17 and the pallet just previously fed to the platform 45 is lowered by gravity into the mould. Subsequently roller 43 of the blade mechanism engages cam rail 24 and continued engagement therewith causes the blades to be projected into closed or compartment forming relation with the mould sides and pallet. The mould passes under the washing apparatus 25 where the mould and pallet are thoroughly cleansed, prior to its advance under the hopper 9 to receive a charge of wet concrete for a subsequent forming cycle.

The blades 35 by reason of their continual retraction from between the set blocks and their insertion thru and into the mould are subjected to excessive wear. I therefore construct the blade of a special material sufficiently hard to withstand wear, such as saw steel, altho any suitable metal or alloy may be utilized. I further propose to make the blade detachable from its spacing block 36 which is not subjected to wear, in order that blade replacements to the blocks may be made at a minimum cost. Altho the blade as illustrated has an uninterrupted surface to form a brick or other product having smooth side surfaces, it will be understood that the blades may be provided with beads or other means to shape an indentation in the side of the product where it is required that the product be distinctively marked. The forming surfaces of the blade may be bodily varied in length and cross section to shape products other than bricks.

The above described apparatus represents one practical embodiment of my apparatus for automatically forming concrete or plastic material in a successive and continued sequence of steps. As many changes could be made in carrying out the above construction, without departing from the scope of the invention, it is intended that all matter contained in the above description or shown in the accompanying drawings shall be interpreted as illustrative and not in a limiting sense.

I claim:

1. In apparatus of the class described, in combination, a trackway, a mold adapted to travel on said trackway, means delivering product forming materials into said mold, and means to impart vibrating movements to a section of the trackway thereby to compact the materials in the mold traveling thereupon, said means comprising fluid containing cylinders arranged in pairs across the section, a pontoon in each of said cylinders, members connecting each pair of pontoons on which said section is supported, and mechanism to vibrate the pontoons and section relative to said cylinders.

2. In apparatus of the class described, in combination, a trackway, a mold adapted to travel on said trackway, means delivering product forming materials into said mold, a section of the trackway extending straightway, and means to impart vibrating movements to said section comprising a plurality of cylinders arranged in pairs across the track, a pontoon in each of said cylinders, members connecting each pair of pontoons on which said section is supported, and a motor having an unbalanced rotor mounted from said section and adapted to vibrate the pontoons and section relative to said cylinders.

3. In apparatus of the above described character, in combination, a traveling mould adapted to be actuated throughout a substantially horizontal path of travel, a surface track for the mould to move upon, means for supplying product forming materials to said mould, means to compact said materials, a cam rail disposed laterally of the track, means on said mold cooperating with said cam rail for automatically releasing the product formed of said materials from the mold, another cam rail disposed below the track, and means on said mold cooperating with said last named cam rail for lifting the product from said mould.

4. The combination of a trackway, a diverging cam track along said trackway, a mold to move upon said trackway, partition members movable in unison out of said mold and having a part to engage and be moved by said cam track to actuate said partitions as the mold moves over the trackway, and guide brackets extending from the mold and in which said partitions are guided during their actuation.

5. The combination of a trackway, a diverging cam track along said trackway, a converging cam track along said trackway, a mold to move upon said trackway, partition members movable in unison out of and into compartment forming relation with said mold and having a part to engage and be moved by said cam tracks to actuate said partitions as the mold moves over the trackway, and guide brackets extending from the mold and in which said partitions are guided during their actuation.

6. A mold comprising a frame member having side members and open ends, partition members adapted to form with said side members a plurality of compartments and mounted for actuation into and out of compartment forming relation, and guide brackets extending from the mold and in which the partition members are guided during their actuation.

7. A mold comprising a frame member having side members and open ends, partition members adapted to form with said side members a plurality of compartments, and movable for actuation into and out of compartment forming relation, said partition members comprising blades which extend between the side members and spacing blocks detachably secured to one end of said blades, means connecting said spacing blocks whereby the blades are actuated in unison, and guide brackets extending from the mold and in which the spacing blocks and blades are guided during their actuation.

8. The combination of a trackway, a mould mounted for travel thereon, and having side members, a pallet arranged in the mould, blades extending between said side members and forming with said side members and pallet a plurality of forming compartments, spacing blocks between said blades, means joining said blades and spacing blocks for movement in unison, and means along said trackway to move said blades away from and back into said side members as said mould travels along said trackway.

9. A mould comprising a frame member having side members and open ends, a pallet arranged therein, a plurality of blades extending between said side members and forming with said side members and pallet a multiple compartment mould, spacing blocks between said blades and detachably secured thereto, and means connecting said blades and spacing blocks, said blades being mounted for movement thru one of said side members into and out of compartment forming relation with said side members.

10. A mould comprising a frame member having side members and open ends, wheels on said frame member whereby the mould may travel along a trackway, a plurality of blades extending between the side members and forming therewith a multiple compartment mould, spacing blocks between said blades and detachably secured thereto, and means connecting said blades and spacing blocks, said blades being mounted for movement thru one of said side members and into seating engagement with the other side member and into and out of compartment forming relation with said side members.

11. The combination of a trackway, a mould adapted to be moved along said trackway, a pallet support in said mould, a pallet mounted on said support, and link mechanism operative between said pallet support and trackway to automatically raise said pallet support to the top of the mould as said mould moves along said trackway.

12. The combination of a trackway, a mould adapted to be moved along said trackway, a pallet support in said mould, a pallet in said mould upon said support, means moving with said mould for lifting said pallet support and pallet to the top of said mould, and a cam track adjacent said trackway and adapted to render operative the said means for lifting said pallet support and pallet as said mould moves along said trackway.

13. The combination of a trackway, a mould movable upon said trackway, a pallet support in said mould, a pallet mounted on said support, partition members fixed with relation to each other and arranged in said mould across said pallet, means for supplying plastic materials to said mould, and means along said trackway for automatically moving said partition members out of and into said mould, and for lifting said pallet support and pallet to the top of said mould, as said mould moves along said trackway.

14. The combination of a trackway, a mould movable upon said trackway, a pallet carried by said mould, means for automatically raising said pallet to the top of said mould as said mould moves along said trackway, a receiving structure to receive the raised pallet and its load from said mould as said mould moves around said trackway, and means operative when said first named means is in raised position for depositing another pallet upon said mould.

15. The combination of a surface track, a mold movable upon said track, a pallet supported in said mold, means for automatically raising the pallet from the bottom of the mold to the top thereof and including a cam rail beneath said track cooperating with the mold as said mold moves over said track, and a tangentially disposed receiving structure to receive the raised pallet and its load from said mold as said mold moves over said track.

16. The combination of an endless trackway, a mould movable upon said trackway, a pallet support in said mould, means for lifting said pallet support to the top of said mould, partition members movable into and out of said mould, a pallet on said support, cam rails along said trackway for moving said partition members out of and into said mould as said mould moves along said trackway and cam rails and for lifting said pallet support and pallet to the top of said mould as said mould moves further along said trackway and other of said cam rails, and a tangentially disposed receiving structure adapted to receive said pallet from said raised pallet support as said mould moves around said endless trackway.

17. The combination of an endless track, a plurality of moulds movable upon said track, an endless cable for driving said moulds, each mould having a cable grip in which said cable rests, means for driving said cable, means for supplying plastic materials to said moulds, means to impart motion to said moulds as they move over a part of said track to compact said materials, and means for automatically removing the formed product from said moulds as said moulds travel along said trackway.

18. The combination of an endless track, at least a section of said track extending straightway and being fluid supported, means to impart a variety of agitating movements to said section, moulds adapted to travel on said track, means to drive the moulds throughout the circuit of the track, means supplying materials to said moulds, the materials being compacted in said moulds as said moulds travel over said moving track section, and means for automatically removing the formed product from said moulds as said moulds travel along said track.

19. The combination of an endless track, moulds movable upon said track, an endless cable around said molds, each mold having a cable grip for said cable, means for driving the endless cable, means for supplying product forming materials to said moulds, and means for automatically imparting vibration to said moulds during a part of their travel to compact said materials thereinto.

20. The combination of a surface track and a plurality of traveling moulds, means for moving said moulds on said track, pallet supporting means in said moulds, pallets on said supporting means, means for automatically lifting said pallets to the tops of said moulds as they travel on said track, means for supplying product forming materials to said moulds as they travel, means for compacting said materials during the movement of said moulds, means engaging the materials across the top of said moulds to level the same, and means for automatically removing the raised pallets with the formed products thereon from said moulds as said moulds travel on said track.

21. The combination of an endless surface track, a cam rail along said track, a mould traveling along said track, a pallet support in said mould adapted to be lifted to the top of said mould by said cam rail as said mould moves therealong, a pallet for said support, and means for removing said pallet from the mould while in its raised position therein as said mould moves along said track and cam rail.

22. The combination of a track, a cam rail along said track, a mould adapted to travel along said track, a pallet support in said mould, link mechanism connected with said pallet support and said mould and adapted to be actuated by said cam rail to lift said pallet support, a pallet in said mould on said pallet support, and means for supplying materials to said mould.

Signed at San Francisco, California, this 14th day of January, 1927.

JOHN C. PELTON.